United States Patent

Matsushita

(10) Patent No.: US 11,028,280 B2
(45) Date of Patent: Jun. 8, 2021

(54) COMPOSITION, CURED PRODUCT, COMPOSITION STORED CONTAINER, IMAGE FORMING APPARATUS, AND IMAGE FORMING METHOD

(71) Applicant: Yuuki Matsushita, Kanagawa (JP)

(72) Inventor: Yuuki Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/355,756

(22) Filed: Mar. 17, 2019

(65) Prior Publication Data

US 2019/0284409 A1   Sep. 19, 2019

(30) Foreign Application Priority Data

Mar. 19, 2018   (JP) .............. JP2018-051726

(51) Int. Cl.
   *C09D 11/30*   (2014.01)
   *C09D 11/101*   (2014.01)
   (Continued)

(52) U.S. Cl.
   CPC .......... *C09D 11/30* (2013.01); *B29C 64/112* (2017.08); *B33Y 70/00* (2014.12); *B41J 11/002* (2013.01);
   (Continued)

(58) Field of Classification Search
   CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596;
   (Continued)

(56) References Cited

U.S. PATENT DOCUMENTS 4,157,418 A * 6/1979 Heilmann ............... C09J 133/08
                                                              428/355 CN
4,172,934 A * 10/1979 Heilmann ............. C08F 220/18
                                                              526/263

(Continued)

FOREIGN PATENT DOCUMENTS

| JP | 4-334551 | 11/1992 |
| JP | 2003-261681 | 9/2003 |

(Continued)

OTHER PUBLICATIONS

Milagros Delgado, et al. "Contrasting One- and Two-Cation Binding Behavior in syn-and anti-Anthraquinone Bibracchial Podand(BiP) Mono- and Dianions Assessed by Cyclic Voltammetry and Electron Paramagnetic Resonance Spectroscopy" J. Am. Chem. Soc. 1988, 110, 119-124.

(Continued)

*Primary Examiner* — Manish S Shah
(74) *Attorney, Agent, or Firm* — Oblon, McClelland, Maier & Neustadt, L.L.P.

(57) ABSTRACT

A composition is provided including an acrylamide compound having an ester structure and a molecular weight of 150 to 200, and a polysilane as a polymerization initiator.

9 Claims, 2 Drawing Sheets

(51) Int. Cl.
- *B41M 5/00* (2006.01)
- *B41M 7/00* (2006.01)
- *B41J 11/00* (2006.01)
- *C09D 11/107* (2014.01)
- *B33Y 70/00* (2020.01)
- *B29C 64/112* (2017.01)

(52) U.S. Cl.
CPC ........ *B41M 5/0023* (2013.01); *B41M 7/0081* (2013.01); *C09D 11/101* (2013.01); *C09D 11/107* (2013.01)

(58) Field of Classification Search
CPC .. B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41M 5/0011; B41M 5/0017; B41M 5/0023; B41M 5/0047; B41M 7/00; B41M 7/0072; B41M 5/52; B41M 5/5218; B41M 5/5227; C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106

See application file for complete search history.

(56) References Cited

U.S. PATENT DOCUMENTS

| | | | | |
|---|---|---|---|---|
| 2004/0219381 | A1* | 11/2004 | Kanakura | C08F 8/14 428/523 |
| 2007/0276066 | A1* | 11/2007 | Ohno | C08L 33/06 524/186 |
| 2008/0198213 | A1* | 8/2008 | Nakazawa | C08L 83/16 347/100 |
| 2008/0250979 | A1* | 10/2008 | Irie | C09D 5/04 106/287.22 |
| 2012/0086762 | A1 | 4/2012 | Noguchi et al. | |
| 2012/0176456 | A1 | 7/2012 | Maekawa et al. | |
| 2012/0293589 | A1 | 11/2012 | Hiraoka | |
| 2013/0144057 | A1 | 6/2013 | Morita | |
| 2013/0267625 | A1 | 10/2013 | Noguchi et al. | |
| 2013/0321539 | A1 | 12/2013 | Hiraoka | |
| 2014/0045965 | A1 | 2/2014 | Noguchi et al. | |
| 2014/0120326 | A1 | 5/2014 | Morita et al. | |
| 2014/0125744 | A1 | 5/2014 | Hiraoka | |
| 2014/0139596 | A1 | 5/2014 | Hiraoka | |
| 2014/0139597 | A1 | 5/2014 | Hiraoka | |
| 2014/0327719 | A1 | 11/2014 | Hiraoka | |
| 2014/0363634 | A1 | 12/2014 | Morita et al. | |
| 2016/0075894 | A1 | 3/2016 | Noguchi et al. | |
| 2016/0297912 | A1 | 10/2016 | Hiraoka | |
| 2016/0319140 | A1 | 11/2016 | Hiraoka | |
| 2016/0340458 | A1 | 11/2016 | Hiraoka | |
| 2016/0347960 | A1 | 12/2016 | Morita et al. | |
| 2016/0369116 | A1 | 12/2016 | Iio et al. | |
| 2017/0008325 | A1 | 1/2017 | Hiraoka et al. | |
| 2017/0022378 | A1 | 1/2017 | Iio et al. | |
| 2017/0073445 | A1 | 3/2017 | Hiraoka | |
| 2017/0137644 | A1 | 5/2017 | Morita et al. | |
| 2017/0183519 | A1 | 6/2017 | Morita et al. | |
| 2018/0016454 | A1 | 1/2018 | Matsushita et al. | |
| 2018/0022101 | A1 | 1/2018 | Hiraoka | |
| 2018/0127607 | A1 | 5/2018 | Morita et al. | |
| 2018/0273781 | A1 | 9/2018 | Matsushita | |

FOREIGN PATENT DOCUMENTS

| | | |
|---|---|---|
| JP | 2008-223014 | 9/2008 |
| JP | 2008-239958 | 10/2008 |
| JP | 2015-013980 | 1/2015 |

OTHER PUBLICATIONS

Kazuaki Furukawa, et al. "Optical properties of Silicon Network Polymers" Macromolecules 1990, 23, 3423-3426.

Koichi Mikami, et al. "Anomalous threo-Diastereoselectivity in Allylic Silane- or Stannane-Aldehyde Condensation Reactions: New Interpretation of the Antiperiplanar vs. Synclinal Problem on the Transition-state Conformations" J. Chem. Soc., Chem. Commun., 1990, 1161-1163.

Anthony R. Manning, et al. "The Systematic Synthesis of Complexes containing μ3-CS Ligands as Two-electron Donors. The preparation and Structure of [{Co(η-$C_5H_5$)}$_2${Fe($PPh_3$)(CO)$_2$}(μ$_3$-S)(μ$_3$-CS)]" J. Chem. Soc., Chem. Commun., 1992, 897-898.

Kenkichi Sakamoto, et al. "Highly Ordered High Molecular Weight Alternating Polysilylene Copolymer Prepared by Anionic Polymerization of Masked Disilene", Macromolecules 1990, 23, 4494-4496.

Von E. Hengge, et al. "Preparation and Charcterization of Cyclohexasilane $Si_6H_{12}$" Z. Anorg. Allg. Chem. 459, 123-130(1979) (with English Abstract).

Edwin Hengge, et al. "Preparation and Properties of Cyclopentasilane", Monatshefte für Chemie 106, 503-512(1975), © by Springer-Verlag 1975, 503-512, (with English Abstract).

Harald Stüger, et al. "Inorganic Bi(cyclopentasilanyls): Synthesis and Spectroscopic Characterization", Z. Anorg. allg. Chem. 621(1995) 1517-1522 (with English Abstract).

Philip Boudjouk, et al. "The Synthesis of the First Spiropentasilane, Octamethylspiropentasilane", J. Chem. Soc., Chem. Commun., 1984, 777-778.

\* cited by examiner

COMPOSITION, CURED PRODUCT, COMPOSITION STORED CONTAINER, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application No. 2018-051726, filed on Mar. 19, 2018, in the Japan Patent Office, the entire disclosure of which is incorporated by reference herein.

BACKGROUND

Technical Field

The present disclosure relates to a composition, a cured product, a composition stored container, an image forming apparatus, and an image forming method.

Description of the Related Art

As an ink used in an active-energy-ray-curable inkjet recording method, a radically-polymerizable ink and a cationically-polymerizable ink are known. Above all, the radically-polymerizable ink is widely used from the viewpoints of production cost and preservation stability of the ink.

As the active-energy-ray-curable radically-polymerizable ink, an ink containing a polymerizable monomer, such as an acrylic acid ester, and a polymerization initiator that generates radicals upon irradiation with an active energy ray is known.

For example, a radically-polymerizable ink containing an acrylamide compound as a polymerizable monomer is known.

SUMMARY

In accordance with some embodiments of the present invention, a composition comprising an acrylamide compound having an ester structure and a polysilane as a polymerization initiator is provided. The acrylamide compound having the ester structure has a molecular weight of 150 to 200.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

A high-molecular-weight monomer as the polymerizable monomer scarcely emits an odor peculiar to the polymerizable monomer but has a drawback that the curability upon irradiation with the active energy ray is poor. A low-molecular-weight monomer has a drawback of a strong odor.

On the other hand, most conventional polymerization initiators degrade curability of a radically-polymerizable ink on the surface of the coating film thereof due to inhibition of curing by oxygen in the air.

In particular, an acrylamide compound comprising an ester compound has high polarity and low water-resistant adhesiveness.

The composition in accordance with some embodiments of the present invention emits little odor and exhibits excellent surface curability and water-resistant adhesiveness upon irradiation with an active energy ray.

Hereinafter, embodiments of the present invention will be explained.

<<Composition>>

The composition of the present disclosure contains an acrylamide compound having an ester structure and a polysilane as a polymerization initiator. The acrylamide compound having an ester structure has a molecular weight of 150 to 200.

In addition, the composition optionally contains a polymerizable compound (A2) other than the acrylamide compound having an ester structure (hereinafter also referred to as acrylamide compound (A1)), a polymerization initiator (B2) other than the polysilane (hereinafter also referred to as polymerization initiator (B1)), a colorant, an organic solvent, and other components. In the following explanations, the composition is also referred to as the active-energy-ray-curable composition.

<Acrylamide Compound (A1)>

The acrylamide compound (A1) has an acrylamide group and an ester structure and is serving as a polymerizable monomer in the active-energy-ray-curable composition. The problem of odor can be solved by using the acrylamide compound (A1) as a polymerizable monomer.

The acrylamide group refers to a polymerizable group in which an acryloyl group ($CH_2=CH-CO-$) binds to a nitrogen atom of an amine compound. The method for synthesizing the acrylamide compound (A1) is not particularly limited. For example, the method may include reacting a compound having an activated acryloyl group such as acrylic acid chloride and acrylic anhydride with an amine compound. The amine compound usable for synthesizing the acrylamide compound (A1) may be either a primary amine or a secondary amine. However, the secondary amine is more preferable since the secondary amine does not generate hydrogen bonds between the amide groups and can provide a tertiary amide that is advantageous for decreasing the viscosity.

The ester structure in the acrylamide compound (A1) is preferably a straight or branched alkyl ester group having 1 to 4 carbon atoms. Examples of the straight or branched alkyl group having 1 to 4 carbon atoms include, but are not limited to, a methyl group, an ethyl group, a propyl group, an isopropyl group, a butyl group, a sec-butyl group, an isobutyl group, and a tert-butyl group.

The acrylamide compound (A1) is preferably a compound represented by the following general formula (1) or (2), and more preferably a compound represented by general formula (1).

general formula (1)

In general formula (1), $R^1$ represents hydrogen atom or a straight or branched alkyl group having 1 to 4 carbon atoms, and preferably represents the straight or branched alkyl group having 1 to 4 carbon atoms. Examples of $R^1$ include, but are not limited to, a methyl group, an ethyl group, a propyl group, an isopropyl group, a butyl group, a sec-butyl group, an isobutyl group, and a tert-butyl group.

In general formula (1), $R^2$ represents a straight or branched alkylene group having 1 to 4 carbon atoms. Examples of $R^2$ include, but are not limited to, a methylene group, an ethane-1,1-diyl group, an ethane-1,2-diyl group, a propane-1,1-diyl group, a propane-1,2-diyl group, a propane-1,3-diyl group, a butane-1,1-diyl group, a butane-1,2-diyl group, a butane-1,3-diyl group, a butane-1,4-diyl group, a 2-methylpropane-1,1-diyl group, a 2-methylpropane-1,2-diyl group, and a 2-methylpropane-1,3-diyl group.

In general formula (1), $R^3$ represents a straight or branched alkyl group having 1 to 4 carbon atoms. Examples of $R^3$ include, but are not limited to, a methyl group, an ethyl group, a propyl group, an isopropyl group, a butyl group, a sec-butyl group, an isobutyl group, and a tert-butyl group.

Provided that, the total number of carbon atoms in $R^1$, $R^2$, and $R^3$ is 2 to 6.

general formula (2)

In general formula (2), a ring X represents a ring structure having 2 to 5 carbon atoms and a nitrogen atom. Examples of the ring X include, but are not limited to, aziridine, azetidine, pyrrolidine, and piperidine, and above all, pyrrolidine and piperidine are preferable.

In general formula (2), $R^4$ represents a single bond, or a straight or branched alkylene group having 1 to 3 carbon atoms. Examples of $R^4$ include, but are not limited to, a single bond, a methylene group, an ethane-1,1-diyl group, an ethane-1,2-diyl group, a propane-1,1-diyl group, a propane-1,2-diyl group, and a propane-1,3-diyl group.

In general formula (2), $R^5$ represents a straight or branched alkyl group having 1 to 3 carbon atoms. Examples of $R^5$ include, but are not limited to, a methyl group, an ethyl group, a propyl group, and an isopropyl group.

Provided that, the total number of carbon atoms in the ring X, $R^4$, and $R^5$ is 3 to 6.

Preferable examples of the compound represented by general formula (1) or (2) include N-acryloyl-N-alkylamino acid alkyl ester (including N-acryloylproline alkyl ester), and N-acryloylpiperidinecarboxylic acid alkyl ester. The alkyl described in this paragraph refers to a straight or branched alkyl having 1 to 4 carbon atoms, and an alkyl having 1 or 2 carbon atoms (i.e. methyl or ethyl) is particularly preferable.

Specific examples of the N-acryloyl-N-alkylamino acid alkyl ester include, but are not limited to, N-acryloyl-N-methylglycine methyl ester, N-acryloyl-N-methylglycine ethyl ester, N-acryloyl-N-methylglycine propyl ester, N-acryloyl-N-methylglycine butyl ester, N-acryloyl-N-ethylglycine methyl ester, N-acryloyl-N-ethylglycine ethyl ester, N-acryloyl-N-ethylglycine propyl ester, N-acryloyl-N-propylglycine methyl ester, N-acryloyl-N-propylglycine ethyl ester, N-acryloyl-N-butylglycine methyl ester, N-acryloyl-N-methylalanine methyl ester, N-acryloyl-N-methylalanine ethyl ester, N-acryloyl-N-methylalanine propyl ester, N-acryloyl-N-ethylalanine methyl ester, N-acryloyl-N-ethylalanine ethyl ester, N-acryloyl-N-propylalanine methyl ester, N-acryloyl-N-methyl-β-alanine methyl ester, N-acryloyl-N-methyl-β-alanine ethyl ester, N-acryloyl-N-ethyl-β-alanine methyl ester, N-acryloyl-N-ethyl-β-alanine ethyl ester, N-acryloyl-N-methylvaline methyl ester, N-acryloylproline methyl ester, and N-acryloylproline ethyl ester.

Specific examples of the N-acryloylpiperidinecarboxylic acid alkyl ester include, but are not limited to, methyl N-acryloylpiperidine-2-carboxylate, methyl N-acryloylpiperidine-3-carboxylate, and methyl N-acryloylpiperidine-4-carboxylate.

In addition, the acrylamide compound (A1) has a molecular weight of 150 to 200. A molecular weight of lower than 150 is undesirable because odor may be generated due to volatilization of the compound, or a problem may be caused in stability of inkjet discharge. If the molecular weight is higher than 200, the curability of the composition and the strength of the cured product thereof may decrease, and furthermore there is a concern about an increase of viscosity of the compound or the composition.

For the purpose of applying the acrylamide compound (A1) to an inkjet recording method, the acrylamide compound (A1) is preferably a colorless or pale yellow transparent liquid having a low viscosity (100 mPa·s or lower) at normal temperature (25° C.). In addition, for safety of users, the acrylamide compound (A1) is preferably without strong acidity and basicity and free from formaldehyde that is a harmful impurity. Furthermore, the acrylamide compound (A1) preferably has a moderate polarity that contributes to improvement in physical properties of the cured product by uniformly dissolving the polymerization initiator (B1) to be used in combination with the acrylamide compound (A1). In addition, for the aforementioned reasons, the molecular weight is preferably 150 to 200.

Although a large number of acrylamide compounds having a polymerizable acrylamide group and no ester structure are commercially available (e.g. N-acryloylmorpholine, N,N-dimethyl acrylamide, N,N-diethylacryl amide, N-isopropylacrylamide, N-(2-hydroxymethyl)acrylamide, N-(hydroxymethyl)acrylamide, N-(butoxymethyl)acrylamide, N-[3-(dimethylamino)propyl]acrylamide, N-(1,1-dimethyl-3-oxobutyl)acrylamide, 2-acrylamide-2-methylpropane-sulfonic acid), it is difficult to find an acrylamide compound satisfying all of the aforementioned preferable requirements (viscosity, hue, safety, polarity, molecular weight). It has been found that the acrylamide compound (A1) of the present disclosure can meet the aforementioned preferable requirements by including an ester structure having neutral and appropriate polarity.

A content of the acrylamide compound (A1) in the active-energy-ray-curable composition is preferably 5.0% by mass to 70.0% by mass, more preferably 15.0% by mass to 60.0% by mass, even more preferably 20.0% by mass to 50.0% by mass. In addition, one type of the acrylamide compound (A1) can be used alone, or two or more types of the acrylamide compounds (A1) can be used in combination.

<Polysilane (Polymerization Initiator (B1))>

Photopolymerization caused by polysilane is hardly affected by oxygen. This is because, even if silyl radicals generated by photoreaction are trapped by oxygen, the produced peroxy radicals react with hydrosilane and the like present in the system to reproduce the silyl radicals. In addition, the polysilane is water-repellent, and is considered to solve the problem of poor water resistance of the acrylamide compound having an ester structure.

The polysilane (polymerization initiator (B1)) preferably has the following structure (1) or (2):

structure (1)

structure (2)

wherein represents an integer of 2 to 100, and R represents a straight or branched alkyl group).

Various methods for synthesizing polysilane are known. For example, JP-3883453-B (corresponding to JP-2003-261681-A) describes the following methods (a) to (d) as methods for synthesizing an aryl-substituted polysilane compound, and these methods can be appropriately used.

(a) Method for dehalogenation polycondensation of a halosilane having an aryl group in the presence of an alkali metal equivalent to halogen atoms (so-called "kipping method", J. Am. Chem. Soc., vol. 110, p. 124 (1988); Macromolecules, vol. 23, p. 3423 (1990))

(b) Method for dehalogenation polycondensation of a halosilane having an aryl group by electroreduction (J. Chem. Soc., Chem. Commun., p. 1161 (1990); J. Chem. Soc., Chem. Commun., p. 897 (1992))

(c) Method for dehydrating polycondensation of a hydrosilane having an aryl group in the presence of a metal catalyst (JP-4-334551-A)

(d) Method for anionic polymerization of disilene crosslinked with biphenyl or the like (Macromolecules, vol. 23, p. 4494 (1990))

(e) A cyclic silicon compound having a phenyl group or an alkyl group is synthesized according to the above method, and then induced into a hydro substitution product, a halogen substitution product, or the like according to a known method (e.g. Z. Anorg. Allg. Chem., vol. 459, p. 123-130 (1979), etc.). These halogenated cyclic silicon compounds (cyclosilane compounds) can be synthesized according to a known method (e.g. Mh. Chem., vol. 106, p. 503 (1975); Z. Anorg. Allg. Chem., vol. 621, p. 1517 (1995); J. Chem. Soc., Chem. Commun., p. 777 (1984)).

As the polysilane, a commercial product can also be used.

The content of the polymerization initiator (B1) in the active-energy-ray-curable composition is preferably 1.0% by mass to 20.0% by mass, more preferably 3.0% by mass to 15.0% by mass, even more preferably 4.0% by mass to 15.0% by mass. In addition, one type of the polymerization initiator (B1) can be used alone, or two or more types of the polymerization initiators (B1) can be used in combination.

The polysilane preferably has a weight average molecular weight of 500 to 100,000 in view of odor and dischargeability.

<Polymerization Initiator (B2)>

The active-energy-ray-curable composition of the present disclosure optionally contains a polymerization initiator (B2) other than the polymerization initiator (B 1) (polysilane). The polymerization initiator (B2) produces active species such as a radical or a cation upon application of energy of an active energy ray and initiates polymerization of a polymerizable compound (monomer or oligomer). As the polymerization initiator (B2), it is suitable to use a known radical polymerization initiator, cation polymerization initiator, base producing agent, or a combination thereof. Of these, a radical polymerization initiator is preferable. Moreover, the polymerization initiator (B2) preferably accounts for 5% to 20% percent by mass of the total content of the composition (100% by mass) to obtain sufficient curing speed. Specific examples of the radical polymerization initiator include, but are not limited to, aromatic ketones, acylphosphine oxide compounds, aromatic onium chlorides, organic peroxides, thio compounds (thioxanthone compounds, thiophenyl-group-containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator (B2). The polymerization accelerator is not particularly limited. Preferred examples thereof include, but are not limited to, amines such as trimethylamine, methyl dimethanolamine, triethanolamine, p-diethyl aminoacetophenone, ethyl p-dimethylamino benzoate, p-dimethylamino benzoate-2-ethylhexyl, N,N-dimthylbenzylamine and 4,4'-bis(diethylamino)benzophenone. The content thereof is determined depending on the identity (type) of the polymerization initiator and the content thereof.

<Polymerizable Compound (A2) Other than Acrylamide Compound (A1)>

As the polymerizable compound (A2) other than the acrylamide compound (A1), known polymerizable monomers typified by (meth)acrylic esters can be used. Examples of the polymerizable compound (A2) include, but are not limited to, methyl (meth)acrylate, ethyl (meth)acrylate, n-butyl (meth)acrylate, allyl (meth)acrylate, glycidyl (meth)acrylate, 2-(dimethylamino)ethyl (meth)acrylate, 2-hydroxyethyl (meth)acrylate, 2-butoxyethyl (meth)acrylate, ethyl carbitol (meth)acrylate, cyclohexyl (meth)acrylate, tetrahydrofurfuryl (meth)acrylate, 2-(2-vinyloxyethoxy)ethyl (meth)acrylate, benzyl (meth)acrylate, 2-phenoxyethyl (meth)acrylate, 2-hydroxy-3-phenoxypropyl (meth)acrylate, isobornyl (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, 1,9-nonanediol di(meth)acrylate, pentaerythritol tri(meth)acrylate, pentaerythritol tetra(meth)acrylate, dipentaerythritol hexa(meth)acrylate, and trimethylolpropane tri(meth)acrylate. Incidentally, the (meth)acrylic acid ester refers to an acrylic acid ester or a methacrylic acid ester, and this description also applies to the (meth)acrylate and the like.

Examples of the polymerizable compound (A2) other than the acrylamide compound (A1) also include an urethane (meth)acrylate derivative obtained by reacting a (meth)acrylic acid ester having a hydroxy group with a compound having an isocyanate group, and an epoxy (meth)acrylate derivative obtained by reacting a (meth)acrylic acid with a compound having an epoxy group.

In addition to these (meth)acrylic acid derivatives, N-vinyl compounds such as N-vinylcaprolactam, N-vinylpyrrolidone, and N-vinylformamide; aromatic vinyl compounds such as styrene and α-methylstyrene; vinyl ethers such as diethyleneglycol divinyl ether, triethyleneglycol divinyl ether, and cyclohexanedimethanol divinyl ether; allyl compounds such as allyl glycidyl ether, diallyl phthalate, and triallyl trimellitate can also be used.

Incidentally, acrylamide compounds containing no ester structure described above can also be used as the other polymerizable compound (A2).

When the composition contains the polymerizable compound (A2) other than the acrylamide compound (A1), the content of the polymerizable compound (A2) in the composition is preferably 1.0% by mass to 60.0% by mass, and more preferably 5.0% by mass to 40.0% by mass. In addition, one type of the polymerizable compound (A2) other than the acrylamide compound (A1) can be used alone, or two or more types of the polymerizable compounds (A2) can be used in combination.

<Colorant>

The active-energy-ray-curable composition of the present disclosure optionally contains a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments; polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments; dye chelates (e.g. basic dye chelates, acid dye chelates, etc.), dye lakes (e.g. basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, dispersants conventionally used to prepare a pigment dispersion, such as a polymer dispersant.

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare the organic solvent. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the active-energy-ray-curable composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, a surfactant, and the like.

<Viscosity>

The viscosity of the active-energy-ray-curable composition of the present disclosure has no particular limit because the viscosity can be adjusted depending on the purpose and application devices. For example, if a discharging device configured to discharge the composition from nozzles is employed, the viscosity of the composition is preferably in the range of 3 to 40 mPa·s, more preferably 5 s to 15 mPa·s, and particularly preferably 6 s to 12 mPa·s in the temperature range of 20° C. to 65° C., preferably at 25° C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'×R24) at a number of rotation of 50 rpm with an appropriate setting of the temperature of hemathermal circulating water in the range of 20° C. to 65° C. VISCOMATE VM-150III can be used for the temperature adjustment of the circulating water.

<Curing Means>

Preferably, the curable composition of the present disclosure is cured by application of heat or irradiation with an active energy ray, and the latter is more preferable.

Active energy rays used for curing an active-energy-ray-curable composition of the present disclosure are not particularly limited, so long as the active energy rays are able to give a sufficient energy for allowing polymerization reaction of polymerizable components in the composition to proceed. Examples of the active energy rays include electron beams, $\alpha$-rays, $\beta$-rays, $\gamma$-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Application Field>

The application field of the active-energy-ray-curable composition of the present disclosure is not particularly limited. It can be applied to any field where active-energy-ray-curable compositions are used. For example, the active-energy-ray-curable composition is selected to a particular application and used for a resin for processing, a paint, an adhesive, an insulant, a releasing agent, a coating material, a sealing material, various resists, and various optical materials.

Figure 2:
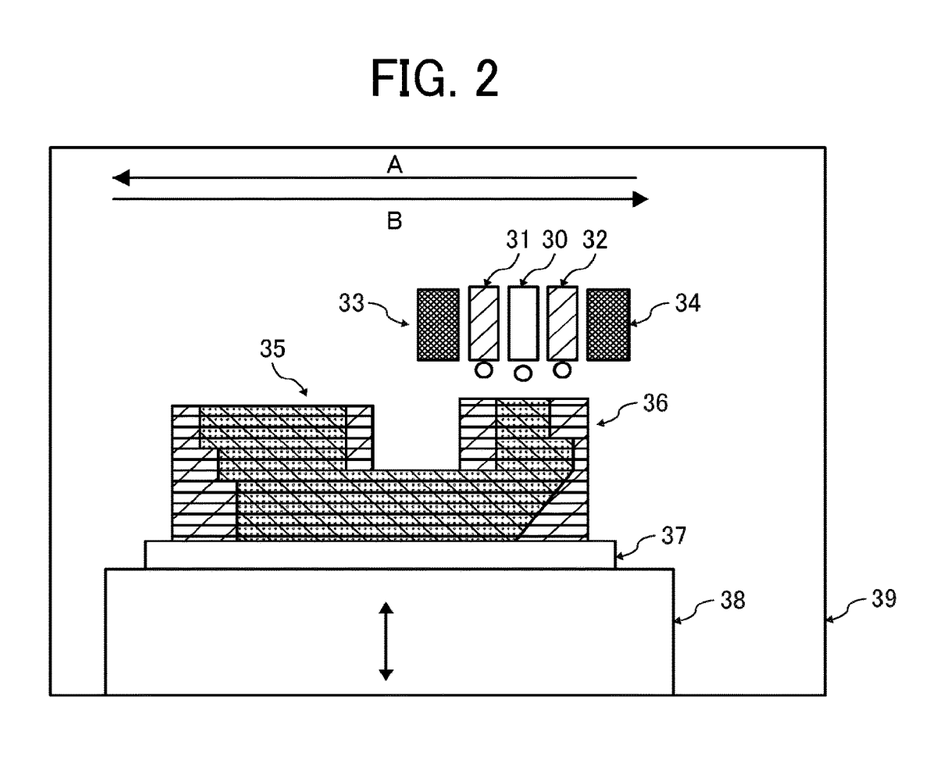
FIG. 2 is a schematic diagram illustrating an image forming apparatus (three-dimensional image forming apparatus) according to an embodiment of the present invention.
Figure 3A:
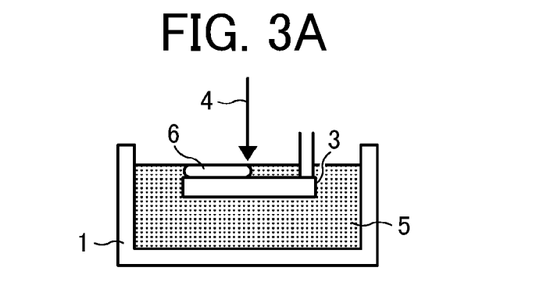
FIGS. 3A to 3D are schematic explanatory diagrams for explaining a method for forming a three-dimensional object using an active-energy-ray-curable composition according to an embodiment of the present invention.
Figure 3B:
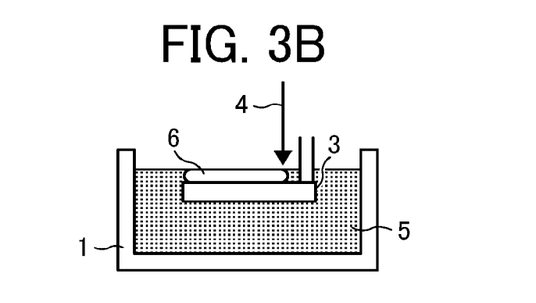
Figure 3C:
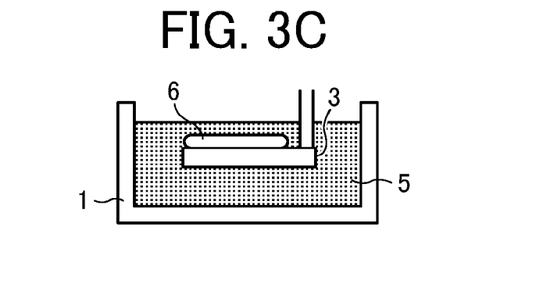
Figure 3D:
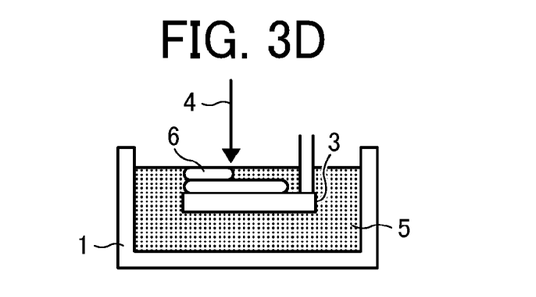

Furthermore, the active-energy-ray-curable composition of the present disclosure can be used as an ink for forming two-dimensional texts, images, and designed coating film on various substrates, and in addition, as a three-dimensional object forming material to form a three-dimensional object. This three-dimensional object forming material may also be used as a binder for powder particles used in a powder layer laminating method of forming a three-dimensional object by repeating curing and layer-forming of powder layers, and as a three-dimensional object constituent material (a model material) and a supporting member (a support material) used in an additive manufacturing method (a stereolithography method) as illustrated in FIG. 2 and FIGS. 3A to 3D. FIG. 2 is a diagram illustrating a method of additive manufacturing to sequentially form layers of the active-energy-ray-curable composition of the present disclosure one on top of the other by repeating discharging the active-energy-ray-curable composition to particular areas, followed by curing the composition upon irradiation of an active energy ray (details will be described below). FIGS. 3A to 3D are diagrams illustrating a method of additive manufacturing to sequentially form cured layers 6 having respective predetermined forms one on top of the other on a movable stage 3 by irradiating a storing pool (storing part) 1 of the active-energy-ray-curable composition 5 of the present disclosure with the active energy ray 4.

An apparatus for fabricating a three-dimensional object by using the active-energy-ray-curable composition of the present disclosure is not particularly limited and can be a known apparatus. For example, the apparatus includes a containing device, a supplying device, and a discharging device of the active-energy-ray-curable composition, and an active energy ray irradiator.

In addition, embodiments of the present invention include cured products obtained by curing the active-energy-ray-curable composition and processed products obtained by processing structures having the cured product on a substrate. The processed product is fabricated by, for example, heat-drawing or punching the cured product or structure having a sheet-like form or film-like form, and suitably used for applications requiring molding of the surface after decoration, such as gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Stored Container>

The composition stored container of the present disclosure refers to a container containing the active-energy-ray-curable composition and is suitable for the applications as described above. For example, when the active-energy-ray-curable composition of the present disclosure is used for ink, a container storing the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable that the container is made of a light blocking material that blocks light or the container is covered with a light blocking sheet or the like.

<Image Forming Method and Image Forming Apparatus>

An image forming method of the present disclosure may be performed using an active energy ray and/or while applying heat.

The image forming method in accordance with some embodiments of the present invention includes at least an irradiating step of irradiating the active-energy-ray-curable composition of the present disclosure with an active energy ray to cure the active-energy-ray-curable composition. The image forming apparatus of the present disclosure includes at least an irradiator to irradiate the curable composition of the present disclosure with an active energy ray and a storing part containing the curable composition of the present disclosure. The storing part may include the container mentioned above. Furthermore, the method and the apparatus may respectively include a discharging step and a discharging device to discharge the active-energy-ray-curable composition. The method of discharging the active-energy-ray-curable composition is not particularly limited, and examples of the method include a continuous jetting method and an on-demand method. The on-demand method includes a piezo method, a thermal method, an electrostatic method, etc.

Figure 1:
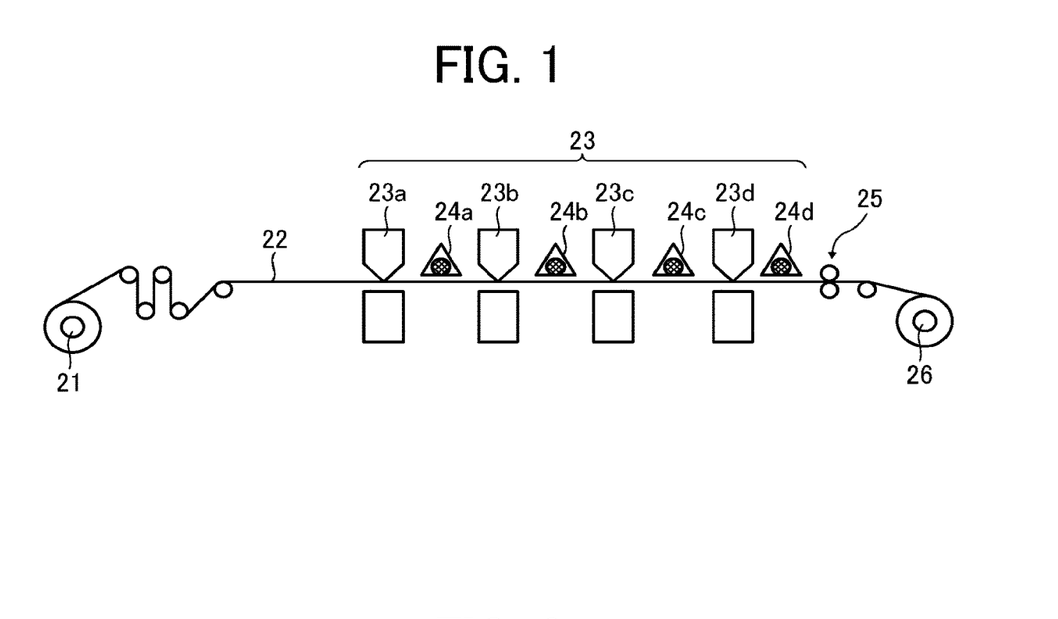
FIG. 1 is a schematic diagram illustrating an image forming apparatus according to an embodiment of the present invention, equipped with an inkjet discharging device.

FIG. 1 is a diagram illustrating an image forming apparatus equipped with an inkjet discharging device.

Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner.

In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples of the recording medium include, but are not limited to, paper, film, ceramics, glass, metal, and composite materials of any of paper, film, ceramics, glass, and metal, each of which may be in the form of a sheet. The image forming apparatus may have either a one-side printing configuration or a two-side printing configuration. The recording medium is not limited to articles used as typical recording media. Examples of articles usable as the recording medium include cardboard, building materials (such as wall paper and floor material), concrete, cloth for apparel (such as T-shirts), textile, and leather.

Optionally, multiple colors can be printed with no or weak active energy ray from the light sources 24a, 24b, and 24c, followed by irradiation of the active energy ray from the light source 24d. As a result, energy and cost can be saved.

Examples of recorded matter having images printed with the ink of the present disclosure include not only those having printed images or texts on a plain surface of conventional paper or resin film, but also those having printed images or texts on a rough surface or a surface made of various materials such as metal or ceramic. In addition, by laminating layers of two-dimensional images, a partially stereoscopic image (formed of two-dimensional parts and three-dimensional parts) or a three-dimensional object can be fabricated.

FIG. 2 is a schematic diagram illustrating another example of the image forming apparatus (three-dimensional (3D) image forming apparatus) of the present disclosure. An image forming apparatus 39 illustrated in FIG. 2 sequentially forms thin layers one on top of the other using a head unit in which inkjet heads are arranged, movable in the directions indicated by the arrows A and B. In the image forming apparatus 39, a discharging head unit 30 for forming additive manufacturing layers discharges a first active-energy-ray-curable composition, and discharging head units 31 and 32 for forming support layers discharges a second active-energy-ray-curable composition having a different composition from the first active-energy-ray-curable composition, while ultraviolet irradiators 33 and 34 adjacent to the discharging head units 31 and 32 cure the compositions. To be more specific, for example, after the discharging head units 31 and 32 discharge the second active-energy-ray-curable composition onto a substrate 37 and the second active-energy-ray-curable composition is solidified by irradiation with an active energy ray to form a first support layer having a pool for composition, the discharging head unit 30 discharges the first active-energy-ray-curable composition onto the pool and the first active-energy-ray-curable composition is solidified by irradiation with an active energy ray, thereby forming a first additive manufacturing layer. This step is repeated multiple times while lowering a stage 38 movable in the vertical direction to laminate the support layers and the additive manufacturing layers to fabricate a solid object 35. Thereafter, a support 36 is removed, if desired. Although only a single discharging head unit 30 for forming additive manufacturing layer is provided to the image forming apparatus 39 illustrated in FIG. 2, it is also possible to provide two or more discharging head units 30.

In the present disclosure, the terms "image" and "cured product" are synonymous with each other.

EXAMPLES

Hereinafter, the present invention will be explained with reference to Examples. However, the present invention is not limited to Examples in any way.

<Constituents of Active-Energy-Ray-Curable Composition>

Abbreviations, compound names, manufacturer names, and product names of the raw materials used for preparing the active-energy-ray-curable compositions are presented in Table 1.

Raw materials not commercially available were synthesized by the methods described in Synthesis Examples 1 to 6. The synthesized compound was identified by nuclear magnetic resonance spectrometry (apparatus: "JNM-ECX 500" manufactured by JEOL Ltd.), and the purity was measured by gas chromatography (apparatus: "GCMS-QP2010 Plus" manufactured by Shimadzu Corporation). These chemical analyses were carried out according to conventional methods.

Synthesis Example 1

<Synthesis of N-acryloyl-N-methylglycine methyl ester (A1-1)>

First, 0.30 mol of N-methylglycine methyl ester hydrochloride (reagent manufactured by Sigma-Aldrich Japan), 0.45 mol of potassium carbonate (reagent manufactured by Kanto Chemical Co., Inc.), and 400 mL of water were stirred and mixed at 0° C. to 10° C., to which 0.33 mol of acrylic acid chloride (reagent manufactured by Wako Pure Chemical Industries, Ltd.) was slowly dripped while maintaining the temperature. After completion of the drip, the mixture was extracted three times with 400 mL of ethyl acetate (reagent manufactured by Kanto Chemical Co., Inc.), and the mixture including the ethyl acetate layer was washed once with 400 mL of water. The ethyl acetate was distilled off under reduced pressure at 40° C. to obtain 0.20 mol of desired N-acryloyl-N-methylglycine methyl ester (A1-1) as a nearly colorless transparent liquid. The purity was 98.3% by mass.

The N-acryloyl-N-methylglycine methyl ester (A1-1) has a molecular weight of 157.2, and this compound is known (CAS Registry Number: 72065-23-7).

Synthesis Example 2

<Synthesis of N-acryloyl-N-methylglycine ethyl ester (A1-2)>

In the same manner as in Synthesis Example 1, 0.22 mol of desired N-acryloyl-N-methylglycine ethyl ester (A1-2)

was obtained as a nearly colorless transparent liquid except that the N-methylglycine methyl ester hydrochloride in Synthesis Example 1 was replaced by N-methylglycine ethyl ester hydrochloride (reagent manufactured by Tokyo Chemical Industry Co., Ltd.). The purity was 98.5% by mass.

The N-acryloyl-N-methylglycine ethyl ester (A1-2) has a molecular weight of 171.2, and this compound is known (CAS Registry Number: 170116-05-9).

Synthesis Example 3

<Synthesis of Methyl N-acryloylpiperidine-4-carboxylate (A1-3)>

In the same manner as in Synthesis Example 1, 0.25 mol of desired methyl N-acryloylpiperidine-4-carboxylate (A1-3) was obtained as a nearly colorless transparent liquid except that the N-methylglycine methyl ester hydrochloride in Synthesis Example 1 was replaced by methyl piperidine-4-carboxylate (reagent manufactured by Tokyo Chemical Industry Co., Ltd.). The purity was 98.6% by mass.

The methyl N-acryloylpiperidine-4-carboxylate (A1-3) has a molecular weight of 197.2, and this compound is known (CAS Registry Number: 845907-51-9).

Synthesis Example 4

<Synthesis of Ethyl N-acryloylpiperidine-3-carboxylate (A2-1)>

In the same manner as in Synthesis Example 1, 0.26 mol of desired ethyl N-acryloylpiperidine-3-carboxylate (A2-1) was obtained as a nearly colorless transparent liquid except that the N-methylglycine methyl ester hydrochloride in Synthesis Example 1 was replaced by ethyl piperidine-3-carboxylate (reagent manufactured by Tokyo Chemical Industry Co., Ltd.). The purity was 98.2% by mass.

The ethyl N-acryloylpiperidine-3-carboxylate (A2-1) has a molecular weight of 211.3, and this compound is known (CAS Registry Number: 1156229-85-4).

Synthesis Example 5

<Synthesis of Ethyl N-acryloylpiperidine-4-carboxylate (A2-2)>

In the same manner as in Synthesis Example 1, 0.27 mol of desired ethyl N-acryloylpiperidine-4-carboxylate (A2-2) was obtained as a nearly colorless transparent liquid except that the N-methylglycine methyl ester hydrochloride in Synthesis Example 1 was replaced by ethyl piperidine-4-carboxylate (reagent manufactured by Tokyo Chemical Industry Co., Ltd.). The purity was 99.2% by mass.

The ethyl N-acryloylpiperidine-4-carboxylate (A2-2) has a molecular weight of 211.3, and this compound is known (CAS Registry Number: 845907-79-1).

The ethyl N-acryloylpiperidine-4-carboxylate (A2-2) has an acrylamide group and an ester structure, but does not fall within the acrylamide compound (A1) of the present disclosure because of the molecular weight of 211.3.

<N-(butoxymethyl) acrylamide (A2-3)>

As N-(butoxymethyl) acrylamide (A2-3), a commercial product (reagent manufactured by Tokyo Chemical Industry Co., Ltd.) was used.

The N-(butoxymethyl) acrylamide (A2-3) has a molecular weight of 157.2 and an acrylamide group, but does not fall within the acrylamide compound (A1) of the present disclosure because of the absence of an ester structure.

Synthesis Example 6

<Synthesis of N-methacryloyl-N-methylglycine methyl ester (A2-4)>

In the same manner as in Synthesis Example 1, 0.22 mol of desired N-methacryloyl-N-methylglycine methyl ester (A2-4) was obtained as a nearly colorless transparent liquid except that the acrylic acid chloride in Synthesis Example 1 was replaced by methacrylic acid chloride (reagent manufactured by Wako Pure Chemical Industries, Ltd.). The purity was 97.2%.

The N-methacryloyl-N-methylglycine methyl ester (A2-4) has a molecular weight of 171.2 and an ester structure, but does not fall within the acrylamide compound (A1) of the present disclosure because of the absence of an acrylamide group.

TABLE 1

|  | Abbreviation | Compound name | Manufacturer name and product name |
|---|---|---|---|
| Acrylamide compund with ester structure having molecular weight of 150 to 200 (A1) | A1-1 | N-acryloyl-N-methylglycine methyl ester (molecular weight: 157.2) | (see Synthesis Example 1) |
|  | A2-2 | N-acryloyl-N-methylglycine ethyl ester (molecular weight: 171.2) | (see Synthesis Example 2) |
|  | A1-3 | Methyl N-acryloylpiperidine-4-carboxylate (molecular weight: 197.2) | (see Synthesis Example 3) |
| Polymerizable compound other than A1 (A2) | A2-1 | Ethyl N-acryloylpiperidine-3-carboxylate (211.3) | (see Synthesis Example 4) |
|  | A2-2 | Ethyl N-acryloylpiperidine-4-carboxylate (211.3) | (see Synthesis Example 5) |
|  | A2-3 | N-(butoxymethyl) acrylamide (molecular weight: 157.2) | Reagent manufactured by Tokyo Chemical Industry Co., Ltd. |
|  | A2-4 | N-Metacryloyl-N-methylglycine methyl ester (molecular weight: 171.2) | (see Synthesis Example 6) |
|  | A2-5 | Phenoxyethyl acrylate (PEA) | "PEA" manufactured by OSAKA ORGANIC CHEMICAL INDUSTRY LTD. |
|  | A2-6 | Isobornyl acrylate (IBXA) | "IBXA" manufactured by OSAKA ORGANIC CHEMICAL INDUSTRY LTD. |

TABLE 1-continued

| | Abbreviation | Compound name | Manufacturer name and product name |
|---|---|---|---|
| | A2-7 | Dipropyleneglycol diacrylate (DPGDA) | "DPGDA" manufactured by OSAKA ORGANIC CHEMICAL INDUSTRY LTD. |
| Polymerization initiator (B1) | B1-1 | Methylphenylsilylene type polysilane | SI-10-10 |
| | B1-2 | Methylphenylsilylene type polysilane | SI-10-20 |
| | B1-3 | Phenylsilylene type polysilane | SI-20-10 |
| | B1-4 | Phenylsilylene type polysilane | SI-20-14 |
| Polymerization initiator other than B1 (B2) | B2-1 | Phenylbis (2,4,6-trimethylbenzoyl) phosphine oxide | "Irgacure" manufactured by BASF Japan |
| | B2-2 | 2,4,6-trimethylbenzoyl-diphenyl-phosphine oxide | "Irgacure TPO" manufactured by BASF Japan |
| | B2-3 | 1-hydroxycyclohexyl phenylketone | "Irgacure 184" manufactured by BASF Japan |
| Other components | Sensitizer | 2,4-diethylthioxanthen-9-one | "DETX" manufactured by DAIDO CHEMICAL INDUSTRY Co., Ltd. |
| | Polymerization inhibitor | 4-methoxyphenol | "Metokinon" manufactured by Seiko Chemical Co., Ltd. |
| | Surfactant | Silicone-based surfactant | "BYK-UV3510" manufactured by BYK Japan KK |

The polymerization initiator (B1) refers to the followings.
B1-1: methylphenylsilylene type polysilane (OGSOL SI-10-1, Mw 1,100, manufactured by Osaka Gas Chemicals Co., Ltd.)
B1-2: methylphenylsilylene type polysilane (OGSOL SI-10-20, Mw 1,800, manufactured by Osaka Gas Chemicals Co., Ltd.)
B1-3: phenylsilylene type polysilane (OGSOL SI-20-10, Mw 1,200, manufactured by Osaka Gas Chemicals Co., Ltd.)
B1-4: phenylsilylene type polysilane (OGSOL SI-20-14, Mw 1,100, manufactured by Osaka Gas Chemicals Co., Ltd.)

Example 1

<Preparation of Active-Energy-Ray-Curable Composition>
A1-1 (20.0% by mass), A2-5 (PEA, 48.8% by mass), A2-6 (IBXA, 15.0% by mass), A2-7 (DPGDA, 5.0% by mass), B1-1 (10.0% by mass), the sensitizer (1.0% by mass), the polymerization inhibitor (0.1% by mass), and the surfactant (0.1% by mass) were sequentially added, and stirred for 2 hours. After visually confirming the absence of dissolution residues, coarse particles were removed by filtering the mixture through a membrane filter to prepare an active-energy-ray-curable composition.

Examples 2 to 20 and Comparative Examples 1 to 4

In the same manner as in Example 1, each active-energy-ray-curable composition was prepared except that the compositions and contents in Example 1 were replaced by the compositions and contents (% by mass) according to the descriptions presented in Table 2.

<Formation of Printed Image by Inkjet>
Each active-energy-ray-curable composition was charged into a composition stored container made of plastic, which was incorporated into an image forming apparatus including an inkjet head ("MH 5440", manufactured by Ricoh Co., Ltd.) as a discharging device, a UV irradiator LightHammer 6 (D valve) manufactured by Fusion UV Systems, Inc. as an active energy ray irradiator, a controller for controlling discharge, and a supply path from the composition stored container to the inkjet head. The temperature of the inkjet head was appropriately adjusted so that the viscosity of the active-energy-ray-curable composition was 10 to 12 mPa·s. The active-energy-ray-curable composition with a film thickness of 10 m was inkjet-discharged onto a commercial PET film ("COSMOSHINE A4100" manufactured by TOYOBO CO., LTD., thickness: 188 μm) as a general-purpose film material, and irradiated with ultraviolet ray emitted by the UV irradiator to prepare a printed image. At this time, printed images irradiated with ultraviolet ray in respective integrated light quantities of 500 mJcm$^2$, 1,000 mJcm$^2$, and 5,000 mJcm$^2$ were prepared.

[Determination on Surface Curability]
The printed images prepared by the aforementioned method were touched with fingers to evaluate tackiness states according to the following four-stage criteria, and the results were attached to the following Table 2. Compounds rated as B or as higher than B are practically usable. No that, a case in which no curing occurred when the integrated light quantity was set to 5,000 mJcm$^2$ was indicated as "-".
A: Neither the surface nor the inside has tackiness at an integrated light quantity of 500 mJcm$^2$.
B: Neither the surface nor the inside has tackiness at an integrated light quantity of 1,000 mJcm$^2$.
C: Either the surface or the inside has tackiness at an integrated light quantity of 1,000 mJcm$^2$.
D: Both the surface and the inside have tackiness at an integrated light quantity of 5,000 mJcm$^2$.

[Determination on Odor of Composition]
The odor felt by an operator during inkjet discharge was evaluated according to the following three-stage criteria, and the results were attached to the following Table 2. Compounds rated as B or as higher than B are practically usable.
A: almost no odor
B: slight odor
C: strong odor

[Determination on Water-Resistant Adhesiveness]
The printed image prepared with ultraviolet irradiation in an integrated light quantity of 5,000 mJcm$^2$ was put into pure water at 40° C., taken out after a period of 24 hours, and subjected to an adhesiveness test. The adhesiveness test was carried out in a method as described below.
Adhesiveness to a substrate was evaluated by a tape peeling test using a transparent pressure-sensitive adhesive tape (Cellotape (registered trade mark) CT-18 manufactured by NICHIBAN CO., LTD.: hereinafter referred to as "tape"), and adherability to the substrate with and without a predetermined incision was evaluated according to the cross-cut method specified in JIS (Japanese Industrial Standard)-K-5600-5-6. In the case with the incision, the internal stress is relaxed with the incision as an end portion, which triggers peeling of the coating film, and thus the evaluation is carried out under a more stringent condition. By contrast, in the case without the incision, there is no trigger for the peeling of the coating film, and thus the evaluation is carried out under a relatively mild condition. In the JIS standard, the adhesiveness to the substrate is expressed by the term adherability, but they are technically synonymous with each other.

In relation to the notation for the results of the tape peeling test in which the tape was bonded to the coating film and then peeled, a state with no peeling was expressed as "Good", and a state with any peeling was expressed as "Bad". As test results in accordance with the cross-cut method in which the tapes were bonded to incisions in 5×5=25 squares provided on the coating film and then peeled, and a state with no peeling was expressed as "Good", and a state with any peeling was expressed as "Bad". At this time, slight peelings caused on the cutting intersections, strongly susceptible to the cutting strength, were ignored.

These results of the adhesiveness test were comprehensively graded as follows.

A: "Good" in tape peeling test, and "Good" in cross-cut method

B: "Good" in tape peeling test, and "Bad" in cross-cut method

C: "Bad" in tape peeling test, and "Bad" in cross-cut method

Compounds rated as B or as higher than B are practically usable.

<Dischargeability Test>

The dischargeability was tested using a simple atomizing apparatus (DropStation, manufactured by Genesis Co., Ltd.). As the head, MH5420 (manufactured by Ricoh Co., Ltd.) was used. The ink was discharged at such a head temperature that the viscosity measured using a cone-plate type rotary viscometer VISCOMETER TVE-22L manufactured by TOKI SANGYO CO., LTD. was 11 (±1) mPa·s. At this time, the viscosity was measured using a 1°34'×R24 cone rotor at a number of rotation of 50 rpm with a setting of the temperature of hemathermal circulating water at 25° C.

The voltage was adjusted so that a Vj was 7 (+0.5) m/s when the distance between the droplet tip of the discharged ink and the nozzle was 1 mm, and then the ink was discharged.

The spraying state was observed using a complementary metal-oxide-semiconductor (CMOS) camera (ARTCAM-036MI, manufactured by ARTRAY. CO., LTD.) arranged perpendicularly to the discharge direction of the ink in such a way that, after the droplet tip passes through a position 1 mm away from the nozzle, the droplet end can be seen at the position 1 mm away from the nozzle. Then omission of the ink droplet one minute after the continuous discharge was observed.

The dischargeability was evaluated as below.

A: The ink droplet is not omitted at a repetitive frequency of 30 kHz, and the ink is stably discharged.

B: The ink droplet is omitted at a repetitive frequency of 30 kHz, and the ink droplet is not omitted at 20 kHz.

C: The ink droplet is omitted at 20 kHz.

Compounds rated as B or as higher than B are practically usable.

TABLE 2

|  | Examples | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| A1-1 | 20.0 | 25.0 | 15.0 | 20.0 | 10.0 | 25.0 | 15.0 | 30.0 | 30.0 | 15.0 | 5.0 | 5.0 | 40.0 |
| A1-2 |  | 25.0 | 15.0 |  |  | 25.0 |  | 30.0 |  |  |  |  | 15.0 |
| A1-3 |  |  |  | 20.0 | 10.0 |  |  |  | 30.0 |  |  |  | 15.0 |
| A2-1 |  |  |  |  |  |  |  |  |  |  |  |  |  |
| A2-2 |  |  |  |  |  |  |  |  |  |  |  |  |  |
| A2-3 |  |  |  |  |  |  |  |  |  |  |  |  |  |
| A2-4 |  |  |  |  |  |  |  |  |  |  |  |  |  |
| A2-5 | 48.8 | 18.8 | 41.3 | 31.3 | 54.8 | 24.8 | 48.8 | 3.8 | 15.8 | 60.8 | 72.8 | 53.8 | 7.8 |
| A2-6 | 15.0 | 15.0 | 15.0 | 15.0 | 15.0 | 15.0 | 15.0 | 15.0 | 15.0 | 15.0 | 15.0 | 15.0 | 15.0 |
| A2-7 | 5.0 | 5.0 | 5.0 | 5.0 | 5.0 | 5.0 | 5.0 | 5.0 | 5.0 | 5.0 | 50 | 5.0 | 5.0 |
| B1-1 |  |  |  |  |  |  | 5.0 |  |  |  |  |  |  |
| B1-2 | 10.0 | 5.0 | 7.5 | 7.5 | 2.0 | 2.0 | 10.0 | 5.0 | 3.0 |  | 1.0 |  | 1.0 |
| B1-3 |  | 5.0 |  |  | 2.0 | 2.0 |  | 10.0 |  |  |  | 10.0 |  |
| B1-4 |  |  |  |  |  |  |  |  |  | 3.0 |  | 10.0 |  |
| B2-1 |  |  |  |  |  |  |  |  |  |  |  |  |  |
| B2-2 |  |  |  |  |  |  |  |  |  |  |  |  |  |
| B2-3 |  |  |  |  |  |  |  |  |  |  |  |  |  |
| Sensitizer | 1.0 | 1.0 | 1.0 | 1.0 | 1.0 | 1.0 | 1.0 | 1.0 | 1.0 | 1.0 | 1.0 | 1.0 | 1.0 |
| Polymerization inhibitor | 0.1 | 0.1 | 0.1 | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 | 0.1 | 0.1 | 0.1 |
| Odor | A | A | A | A | A | A | B | A | A | A | B | B | A |
| Surface curability | A | A | A | A | A | A | A | A | A | A | A | A | A |
| Water-resistant adhesiveness | A | A | A | A | A | A | A | A | B | B | B | A | B |
| Dischargeability | A | A | A | A | A | A | A | A | A | A | A | B | A |

TABLE 2-continued

| | Examples | | | | | | | Comparative Examples | | | |
|---|---|---|---|---|---|---|---|---|---|---|---|
| | 14 | 15 | 16 | 17 | 18 | 19 | 20 | 1 | 2 | 3 | 4 |
| A1-1 | 20.0 | 25.0 | 25.0 | 25.0 | 25.0 | 25.0 | 30.0 | 15.0 | | | |
| A1-2 | 50.0 | | | | | 25.0 | 30.0 | 15.0 | | | |
| A1-3 | | | | | | | | | | | |
| A2-1 | | 25.0 | | | | | | | 15.0 | | |
| A2-2 | | | 25.0 | | | | | | 15.0 | 15.0 | |
| A2-3 | | | | 25.0 | | | | | | 15.0 | 15.0 |
| A2-4 | | | | | 25.0 | | | | | | 15.0 |
| A2-5 | 3.8 | 18.8 | 18.8 | 18.8 | 18.8 | 13.8 | 3.8 | 38.8 | 38.8 | 38.8 | 38.8 |
| A2-6 | | 15.0 | 15.0 | 15.0 | 15.0 | 15.0 | 15.0 | 15.0 | 15.0 | 15.0 | 15.0 |
| A2-7 | 5.0 | 5.0 | 50 | 5.0 | 5.0 | 5.0 | 5.0 | 5.0 | 5.0 | 5.0 | 5.0 |
| B1-1 | | 10.0 | | | | | | | 5.0 | 5.0 | 5.0 |
| B1-2 | 10.0 | | 10.0 | 10.0 | 10.0 | 10.0 | 5.0 | | 5.0 | 5.0 | 5.0 |
| B1-3 | 5.0 | | | | | | | | | | |
| B1-4 | 5.0 | | | | | | | | | | |
| B2-1 | | | | | | 5.0 | | 5.0 | | | |
| B2-2 | | | | | | | 5.0 | 5.0 | | | |
| B2-3 | | | | | | | 5.0 | | | | |
| Sensitizer | 1.0 | 1.0 | 1.0 | 1.0 | 1.0 | 1.0 | 1.0 | 1.0 | 1.0 | 1.0 | 1.0 |
| Polymerization inhibitor | 0.1 | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 | 0.1 |
| Odor | A | A | A | B | B | A | A | A | A | B | A |
| Surface curability | A | B | B | A | B | B | B | B | C | D | D |
| Water-resistant adhesiveness | A | A | A | A | A | A | B | C | A | A | A |
| Dischargeability | B | A | A | A | A | A | A | A | A | A | A |

Numerous additional modifications an variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A composition comprising:
   an acrylamide compound having an ester structure and a molecular weight of 150 to 200; and
   a polysilane as a polymerization initiator,
   wherein the polysilane comprises the following structure (1) or (2):

structure (1)

structure (2)

where n represents an integer of 2 to 100, and R represents a straight or branched alkyl group.

2. The composition according to claim 1, wherein acrylamide compound having an ester structure comprises a straight or branched alkyl ester group having 1 to 4 carbon atoms.

3. The composition according to claim 1, wherein the acrylamide compound having an ester structure is represented by the following general formula (1) or (2):

$$CH_2=CH-CO-N(R^1)-R^2-CO-O-R^3 \quad \text{general formula (1)}$$

where $R^1$ represents hydrogen atom or a straight or branched alkyl group having 1 to 4 carbon atoms, $R^2$ represents a straight or branched alkylene group having 1 to 4 carbon atoms, $R^3$ represents a straight or branched alkyl group having 1 to 4 carbon atoms, and a total number of carbon atoms in $R^1$, $R^2$, and $R^3$ is 2 to 6;

general formula (2)

$$CH_2=CH-CO-N\ X\ -R^4-CO-O-R^5$$

where a ring X represents a ring structure having 2 to 5 carbon atoms and a nitrogen atom, $R^4$ represents a single bond or a straight or branched alkylene group having 1 to 3 carbon atoms, and $R^5$ represents a straight or branched alkyl group having 1 to 3 carbon atoms, and a total number of carbon atoms in the ring X, $R^4$, and $R^5$ is 3 to 6.

4. The composition according to claim 3, wherein the acrylamide compound having an ester structure is represented by general formula (1), and $R^3$ represents an alkyl group having 1 to 2 carbon atoms.

5. The composition according to claim 1, wherein the polysilane has a weight average molecular weight of 500 to 100,000.

6. A cured product obtained by curing the composition according to claim 1.

7. A composition stored container comprising:
a container; and
the composition according to claim 1 stored in the container.

8. An image forming apparatus comprising:
the composition stored container according to claim 7;
a discharging device to discharge the composition contained in the container; and
an irradiator to irradiate the discharged composition with an active energy ray.

9. An image forming method comprising:
discharging the composition according to claim 1; and
irradiating the discharged composition with an active energy ray to cure the composition.

* * * * *